(12) United States Patent
Dalton

(10) Patent No.: US 6,448,340 B1
(45) Date of Patent: *Sep. 10, 2002

(54) GOLF BALL COMPOSITION COMPRISING HIGH ACID AND VLMI IONOMERS

(76) Inventor: Jeffrey L. Dalton, 14 Sleepy Hollow Rd., Dartmouth, MA (US) 02747

( * ) Notice: Subject to any disclaimer, the term of this patent is extended or adjusted under 35 U.S.C. 154(b) by 0 days.

This patent is subject to a terminal disclaimer.

(21) Appl. No.: 09/640,726

(22) Filed: Aug. 18, 2000

Related U.S. Application Data

(63) Continuation of application No. 09/080,797, filed on May 18, 1998, now Pat. No. 6,114,455.

(51) Int. Cl.⁷ .................. A63B 37/12; A63B 37/02; C08L 33/02
(52) U.S. Cl. ............ 525/221; 525/196; 525/201; 473/373; 473/374; 473/378; 473/385
(58) Field of Search ................ 525/196, 201, 525/221; 473/373, 374, 378, 385

(56) References Cited

U.S. PATENT DOCUMENTS

| | | | |
|---|---|---|---|
| 3,264,272 A | 8/1966 | Rees | 260/78.5 |
| 4,431,193 A | 2/1984 | Nesbitt | 273/235 R |
| 4,650,193 A | 3/1987 | Molitor et al. | 273/228 |
| 4,801,649 A | 1/1989 | Statz | 525/183 |
| 4,884,814 A | 12/1989 | Sullivan | 273/235 R |
| 4,984,804 A | 1/1991 | Yamada et al. | 273/235 R |
| 5,068,151 A | 11/1991 | Nakamura | 428/407 |
| 5,120,791 A | 6/1992 | Sullivan | 525/196 |
| 5,222,739 A | 6/1993 | Horiuchi et al. | 273/235 R |
| 5,298,571 A | 3/1994 | Statz et al. | 525/330.2 |
| 5,415,937 A | 5/1995 | Cadorniga et al. | 428/407 |
| 5,688,869 A | 11/1997 | Sullivan | 525/196 |
| 5,873,796 A | 2/1999 | Cavallaro | 473/365 |
| 6,114,455 A * | 9/2000 | Dalton | |

FOREIGN PATENT DOCUMENTS

| | | |
|---|---|---|
| GB | 2 267 908 A | 12/1993 |
| GB | 2 278 609 A | 7/1994 |
| GB | 2 286 594 A | 8/1995 |
| GB | 2 311 293 A | 9/1997 |
| WO | WO 95/00212 | 1/1995 |
| WO | WO 97/18861 | 5/1997 |

\* cited by examiner

*Primary Examiner*—David J. Buttner
(74) *Attorney, Agent, or Firm*—Swidler Berlin Shereff Friedman, LLP

(57) ABSTRACT

A golf ball comprising at least a cover layer and a core layer, wherein at least one layer is formed from a blend comprising about 97 wt. % to about 20 wt. % of at least one high acid ionomer resin, about 3 wt. % to less than 15 wt. % of at least one very low muodulus ionomer (VLMI) resin, and optionally less than about 70 wt. % of at least one standard ionomer resin.

25 Claims, No Drawings

GOLF BALL COMPOSITION COMPRISING HIGH ACID AND VLMI IONOMERS

CROSS-REFERENCE TO RELATED APPLICATIONS

This application is a continuation of U.S. patent application No. 09/080,797, filed May 18, 1998, now U.S. Pat. No. 6,114,455, the entice disclosure of which is incorporated by reference herein.

FIELD OF INVENTION

The present invention is directed to golf balls comprising at least a cover layer and a core layer, wherein at least one of the layers is formed from a composition comprising an ionomeric blend as well as a variety of standard golf ball additives; wherein the ionomeric blend comprises from about 97 wt. % to about 20 wt. % of at least one high acid ionomer resin, from about 3 wt. % to <15 wt. % of at least one very low modulus ionomer resin and from 0 wt. % to about 70 wt. % of at least one standard ionomer resin.

BACKGROUND OF THE INVENTION

For the last two decades, resin materials known as ionomers have been used extensively as cover stock materials for golf balls. It has been found that such covers provide acceptable in-play characteristics to the balls, such as initial velocity, spin rate and feel.

These resins are well known to those of ordinary skill in the golf ball art and are commercially available under a variety of trade names such as SURLYN® (DuPont) and IOTEK® (Exxon). Presently, there are more than 50 grades of ionomers commercially available having a wide range of properties which vary according to a variety of parameters such as the type and amount of metal cations, molecular weight and composition of the base resin (e.g., the relative content of ethylene and methacrylic and/or acrylic acid groups).

Generally speaking, commercial ionomers consist of a copolymer of a mono-olefin, e.g., an alkene, with at least one other type of comonomer selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof) with from about 10% to about 90% of the carboxylic acid groups neutralized by a metal ion, e.g., see U.S. Pat. No. 3,264,272. More particularly, such acid-containing ethylene copolymer ionomers include E/X/Y copolymers where E is ethylene, X is a softening comonomer such as acrylate or methacrylate present in an amount of from 0 wt. % to about 50 wt. % of the polymer, and Y is acrylic or methacrylic acid present in an amount from about 5 wt. % to about 35 wt. % of the polymer, wherein the acid moiety is neutralized from about it to about 90% to form an ionomer by a cation such as lithium, sodium, potassium, magnesium, calcium, barium, lead, tin, zinc or aluminum, or a combination of such cations.

"High acid ionomers", as used herein and as known to those of ordinary skill in the art, are those ionomer resins wherein Y is acrylic or methacrylic acid units present from 16.5 wt. % to about 35 wt. % in the polymer. Generally, a high acid ionomer will have a flexural modulus from about 50,000 psi to about 125,000 psi. In the vernacular of the golf ball art, high acid ionomers are sometimes referred to as "hard" ionomers.

"Very low modulus ionomers", or "VLMI", as used herein and as known to those of ordinary skill in the art, are those ionomer resins further comprising a softening comonomer X, commonly a (meth)acrylate ester, present from about 10 wt. % to about 50 wt. % in the polymer. Typical softening comonomers include n-butyl acrylate, iso-butyl acrylate, n-butyl methacrylate, methyl acrylate and methyl methacrylate. Generally, a VLMI will have a flexural modulus from about 2,000 psi to about 10,000 psi. VLMI are sometimes referred to as "soft" ionomers.

"Standard ionomers", as that term is used herein and as known to those of ordinary skill in the art, are those ionomer resins generally without a softening comonomer X and wherein Y is acrylic or methacrylic acid units present from about 1 wt. % to <16.5 wt. % in the polymer. Generally, a standard ionomer will have a flexural modulus from about 20,000 psi to about 80,000 psi. Standard ionomers are also sometimes referred to as "hard" ionomers in the art to distinguish them from VLMI.

Cover compositions formed from blends of standard ionomers typically provide balls with acceptable resilience and distance characteristics.

A number of patents are directed towards improved ionomer blends comprising high acid ionomers. U.S. Pat. No. 5,298,571 to Statz et al., for example, discloses blends of ionomers, each ionomer comprising between 16 wt. % and 25 wt. % acid groups. Such blends are further limited in that the coefficient of restitution of a golf ball comprising a cover formed from these blends must be greater than 0.7. The coefficient of restitution, or "COR", is a measure of resilience of a golf ball well known to those in the golf ball arts. Its value increases as a golf ball becomes more resilient, i.e., as the amount of energy lost when a golf ball rebounds from a collision with a steel plate decreases. Furthermore, the blends disclosed by the subject reference are neutralized with only lithium, zinc and, optionally, sodium, all present within prescribed ratios. The Statz et al. reference, however, does not disclose any blends comprising high acid ionomer(s) and a VLMI.

Golf ball covers, such as those described above comprising standard ionomer(s), high acid ionomer(s) and/or blends thereof, provide golf balls with high initial velocity. However, golf balls formed with such covers are known to have a low spin rate, a characteristic which is looked upon unfavorably by skilled golfers. Therefore, other patents and patent publications are directed toward improving the spin rate and other desirable cover properties, such as click and feel, by forming cover compositions from ionomer blends comprising a VLMI. For example, U.S. Pat. No. 4,884,814 to Sullivan discloses golf ball covers comprising blends of a high flexural modulus (hard) ionomer and a low flexural modulus (soft) ionomer. The hard ionomers are copolymers of an olefin and an unsaturated monocarboxylic acid, neutralized with sodium or zinc, and have a flexural modulus of about 30,000 to 55,000 psi and a Shore D hardness of about 60 to 66; SURLYN® 9910, 8528, 8940 and 9650 are exemplified. None of the exemplified hard ionomers appear to have an acid content exceeding 15 wt. %, thus, they are standard ionomers. The soft ionomers are terpolymers of an olefin, an unsaturated monocarboxylic acid, and an acrylate ester, i.e., VLMIs. These terpolymers are neutralized with zinc or sodium and have a flexural modulus of about 3,000 to 7,000 psi and a Shore D hardness of about 25 to 40; SURLYN® AD-8269 and AD-8265 are exemplified. The resulting cover is disclosed as being softer than a hard-ionomer covered ball such that adequate spin can be imparted to the ball by a skilled golfer. However, this reference does not disclose a blend of a VLMI and a high acid ionomer.

U.S. Pat. No. 5,120,791 to Sullivan, closely related to the previous reference, discloses golf ball cover compositions containing blends of at least one hard ionomeric resin, preferably an acrylic acid ionomer, and at least one acrylic acid based soft ionomer. Hard ionomers neutralized with sodium, zinc, magnesium or lithium and having a Shore D hardness of 55 to 66 are disclosed; SURLYN® 8940 and 9910, each containing about 15 wt. % of methacrylic acid, and, preferably, IOTEK® 4000 and 8000, containing about 16 and 11 wt. % acrylic acid, respectively, are disclosed. The disclosed soft ionomers are sodium or zinc neutralized terpolymers of an olefin, acrylic acid, and an unsaturated acrylate ester monomer, i.e., VLMIs, and have a flexural modulus of about 2,000 to 10,000 psi and a Shore D hardness of about 20 to 50; IOTEK® 7520, an ethylene/methyl acrylate/acrylic acid terpolymer partially neutralized with zinc, is exemplified. However, this reference does not disclose a blend of a VLMI and a high acid ionomer.

UK Patent Application GB 2,278,609 A discloses a three-piece golf ball with a cover layer formed from blends of a high flexural modulus (hard) ionomer and a low flexural modulus (soft) ionomer. The hard ionomers are disclosed to be copolymers of an olefin and an unsaturated monocarboxylic acid, neutralized with sodium, zinc, magnesium or lithium, having a flexural modulus of about 15,000 to 70,000 psi and a Shore D hardness of at least 50; SURLYN® 8940 and 9910, each containing about 15 wt. % of methacrylic acid, and IOTEK® 4000 and 8000, containing about 16 and 11 wt. % acrylic acid, respectively, are exemplified. Thus, these hard ionomers are standard ionomers and not high acid ionomers. The soft ionomers are disclosed to be terpolymers of an olefin, an unsaturated monocarboxylic acid, and an acrylate ester, i.e., VLMIs. These terpolymers are neutralized with zinc or sodium, and have a flexural modulus of about 1,000 to 10,000 psi and a Shore D hardness of about 25 to 40; IOTEK® 7520 and 7510, each consisting of an ethylene/methyl acrylate/acrylic acid terpolymer partially neutralized with zinc, are exemplified. However, this reference does not disclose a blend of a VLMI and a high acid ionomer.

While the above-described cover blends comprising VLMIs improve playability, i.e., increase spin rate and improve click and feel, it is recognized that other desirable golf ball properties, particularly the resilience (e.g., COR) and distance properties, are negatively impacted by the inclusion of the VLMI.

PCT Patent Publication No. WO 95/00212 discloses an ionomer cover blend comprising a VLMI and another ionomer, i.e., an ethylene copolymer with acrylic or methacrylic acid and having an acid level of from 14 to 22 wt. %, which may be a high acid ionomer. These cover compositions must contain relatively large amounts, at least 15 wt. % and preferably at least 45 wt. %, of a VLMI component which is characterized as soft, i.e., with a flexural modulus from 1,000 to 10,000 psi, blended with the other ionomer component characterized as hard, i.e., with a flexural modulus of 50,000 to 110,000 psi. However, the durability of these disclosed cover compositions is poor.

U.S. Pat. No. 5,415,937 to Cadorniga et al. discloses a cover blend comprising a high acid ionomer and a VLMI which is said to improve the feel and playability of the ball while also retaining the distance and resilience of prior art balls containing no VLMI component. In particular, a golf ball cover blend of 80 to 50% of a high stiffness ionomer and 20 to 50% of a VLMI is disclosed. This reference defines high stiffness ionomers as a copolymer of 75 to 80% of an olefin and 25 to 20% of an alpha, beta ethylenically unsaturated carboxylic acid, having 10 to 90% of the acid groups neutralized with sodium, lithium, zinc, or magnesium. The high stiffness ionomers preferably have a flexural modulus of 60,000 to 120,000 psi and a Shore D hardness of at least 70. The VLMI are defined as terpolymers, consisting of 67 to 70 wt. % of ethylene, 23 to 20 wt. % of n- or iso-butyl-acrylate, and 10 wt. % of methacrylic acid, where 10 to 90% of the acid groups are neutralized by sodium, zinc, or lithium. The VLMI preferably have a flexural modulus of 2,000 to 8,000 psi and a Shore D hardness of 20 to 50. Golf balls having covers incorporating the disclosed blends have a slightly improved COR and initial velocity with spin rates that range from slightly better than prior art blends to significantly lower, depending upon the particular blend and the club used in the test, i.e., a driver, a 5-iron or a pitching wedge. However, a very high amount of VLMI, at least 20%, still is present in all of the Cadorniga et al. ionomer blends.

While some of the high acid ionomer and VLMI cover blends of Cadorniga et al. provide an acceptable combination of initial velocity and playability, golf balls formed from such covers are known to suffer from poor durability, particularly as demonstrated by their tendency to suffer cover cracks at a low numbers of hits.

Therefore, despite the above-described advantages of golf balls with ionomer blend covers, there exists a need for golf balls comprising high acid ionomers having superior cover durability when compared to existing golf balls with high acid/standard ionomer and with high acid/VLMI cover blends. Furthermore, there exists a need for golf balls which have improved initial velocity and COR when compared to existing golf balls comprising high acid/VLMI cover blends.

SUMMARY OF THE INVENTION

One embodiment of the present invention relates to a golf ball comprising a core layer and a cover layer, wherein at least one of the layers is formed of a composition comprising a blend of ionomeric components, the blend comprising:

(a) from about 94 wt. % to about 15 wt. % of at least one high acid ionomer resin having an acid monomer content, wherein the amount of acid monomer present is from 16.5% to about 35% by weight of the high acid ionomer resin;

(b) from about 3 wt. % to <15 wt. % of at least one very low modulus ionomer resin having a softening comonomer, wherein the amount of the softening comonomer present is from about 15% to about 35% by weight of the very low modulus ionomer resin; and (c) from about 3 wt. % to about 70 wt. % of at least one standard ionomer resin having a second acid monomer content, wherein the amount of the second acid monomer present is from about 5% to <16.5% by weight of the standard ionomer resin.

The high acid ionomer is preferably a copolymer of ethylene and from 16.5% to about 25% by weight of at least one comonomer selected from acrylic acid and methacrylic acid, the acid moiety being neutralized from about 1% to about 90% by at least one cation. The standard ionomer is preferably a copolymer of ethylene and from about 9% to about 15% by weight of at least one comonomer selected from acrylic acid and methacrylic acid, the acid moiety being neutralized from about 1% to about 90% by at least one cation. The very low modulus ionomer is preferably a copolymer of ethylene, from about 18% to about 27% by weight of the softening comonomer and from about 9% to about 15% by weight of at least one comonomer selected from acrylic acid and methacrylic acid, the acid moiety being neutralized from about 1% to about 90% by at least one cation. The softening comonomer of the very low modulus ionomer is preferably selected from n-butyl(meth) acrylate, iso-butyl(meth)acrylate, ethyl(meth)acrylate, methyl(meth)acrylate and mixtures thereof. In all of these ionomers, the cation is preferably selected from lithium, sodium, potassium, agnesium, calcium, barium, lead, tin, zinc, aluminum and mixtures thereof.

The golf ball may further comprise at least one intermediate layer interposed between the cover layer and the core layer, wherein at least one of the layers is formed of the composition of the invention. Preferably, at least one intermediate layer and/or the cover layer of the golf ball is formed from the composition.

The cover composition may further comprise from about 1 wt. % to about 10 wt. % of a color concentrate and from about 90 wt. % to about 99 wt. % of the blend. Preferably, the color concentrate comprises from about 20 wt. % to about 60 wt. % of at least one coloring agent, which may comprise $TiO_2$, and from about 80 wt. % to about 40 wt. % of at least one carrier ionomer resin.

In another embodiment the invention relates to a golf ball comprising a core layer, a cover layer and at least one intermediate layer interposed between the cover layer and the core layer, where at least one of the layers is formed of a composition comprising a blend of ionomeric components, the blend comprising:

(a) from about 94 wt. % to about 15 wt. % of at least one high acid ionomer;

(b) from about 3 wt. % to <15 wt. % of at least one very low modulus ionomer; and (c) from about 3 wt. % to about 70 wt. % of at least one standard ionomer.

In a further embodiment the invention relates to a golf ball comprising a core layer and a cover layer, where at least one of the layers is formed of a composition comprising a blend of ionomeric components, the blend comprising:

(a) from about 97 wt. % to about 20 wt. % of at least one high acid ionomer, i.e., an ionomer resin with from 16.5% to about 35% by weight of the acid monomer present by weight of the high acid ionomer; and (b) from about 3 wt. % to <15 wt. % of at least one very low modulus ionomer, i.e., an ionomer resin with from about 15% to about 35% by weight of a softening comonomer present by weight of the very low modulus ionomer.

The blend of ionomeric components may further comprise:

(c) from about 3 wt. % to about 70 wt. % of at least one standard ionomer, i.e., an ionomer resin with from about 5% to <16.5% by weight of the acid monomer present by weight of the standard ionomer.

Optionally, the blend comprises from about 97 wt. % to about 85 wt. % of at least one high acid ionomer. The high acid ionomers include copolymers of ethylene and from 16.5% to about 25% by weight of at least one comonomer selected from acrylic acid and methacrylic acid, the acid moiety being neutralized from about 1% to about 90% by at least one cation selected from lithium, sodium, potassium, magnesium, calcium, barium, lead, tin, zinc and aluminum.

The very low modulus ionomers of the blend include copolymers of ethylene, from about 18% to about 27% by weight of the softening comonomer and from about 9% to about 15% by weight of at least one comonomer selected from acrylic acid and methacrylic acid, the acid moiety being neutralized from about 1% to about 90% by at least one cation selected from lithium, sodium, potassium, magnesium, calcium, barium, lead, tin, zinc and aluminum. Preferred softening comonomers of the very low modulus ionomer include n-butyl(meth)acrylate, iso-butyl(meth) acrylate, ethyl(meth)acrylate, methyl(meth)acrylate and mixtures thereof.

The standard ionomers of the blend include copolymers of ethylene and from about 9% to about 15% by weight of at least one comonomer selected from acrylic acid and methacrylic acid, the acid moiety being neutralized from about 1% to about 90% by at least one cation.

Preferably, the cover layer of the golf ball is formed from the composition. In this instance, the cover composition may further comprise from about 1 wt. % to about 10 wt. % of a color concentrate and from about 90 wt. % to about 99 wt. % of the blend. Preferably, the color concentrate comprises from about 20 wt. % to about 60 wt. % of at least one coloring agent, which may comprise $TiO_2$, and from about 80 wt. % to about 40 wt. % of at least one carrier ionomer resin.

An additional embodiment of the present invention is a golf ball comprising a cover and a core, where the cover is formed from a cover composition comprising a blend of ionomeric components, the blend comprising:

(a) from about 70 wt. % to about 17 wt. % of at least one high acid ionomer, i.e., an ionomer resin with from 16.5% to about 25% by weight of the acid monomer present by weight of the high acid ionomer;

(b) from about 5 wt. % to about 14 wt. % of at least one very low modulus ionomer, i.e., an ionomer resin with from about 18% to about 27% by weight of a softening comonomer present by weight of the very low modulus ionomer; and (c) from about 25 wt. % to about 68 wt. % of at least one standard ionomer, i.e., an ionomer resin with from about 9% to about 15% by weight of the acid monomer present by weight of the standard ionomer.

An alternate embodiment of the present invention relates to a method of making a golf ball, which comprises forming a core layer and forming a cover layer over the core layer, where at least one of the layers is formed of a composition comprising:

(a) from about 97 wt. % to about 20 wt. % of at least one high acidionomer, i.e., an ionomer resin with from 16.5% to about 35% by weight of the acid monomer present by weight of the high acid ionomer; and (b) from about 3 wt. % to <15 wt. % of at least one very low modulus ionomer, i.e., an ionomer resin with from about 15% to about 35% by weight of a softening comonomer present by weight of the very low modulus ionomer.

The blend of ionomeric components may further comprise:

(c) from about 3 wt. % to about 70 wt. % of at least one standard ionomer, i.e., an ionomer resin with from about 5% to <16.5% by weight of the acid monomer present by weight of the standard ionomer.

Preferably, the cover layer of the golf ball comprises the composition.

A further alternate embodiment of the invention relates to a method of making a golf ball, which comprises forming a core layer, forming at least one intermediate layer about the core layer, and forming a cover layer over the at least one intermediate layer, where at least one of the layers is formed of a composition comprising:

(a) from about 97 wt. % to about 20 wt. % of at least one high acid ionomer, i.e., an ionomer resin with from 16.5% to about 35% by weight of the acid monomer present by weight of the high acid ionomer; and (b) from about 3 wt. % to <15 wt. % of at least one very low modulus ionomer, i.e., an ionomer resin with from about 15% to about 35% by weight of a softening comonomer present by weight of the very low modulus ionomer.

The blend of ionomeric components may further comprise:

(c) from about 3 wt. % to about 70 wt. % of at least one standard ionomer, i.e., an ionomer resin with from about 5% to <16.5% by weight of the acid monomer present by weight of the standard ionomer.

Preferably, at least one intermediate layer and/or the cover layer of the golf ball is formed from the composition.

DETAILED DESCRIPTION OF THE INVENTION

All golf ball covers, whether they are formed from ionomers or balata, typically exhibit failures such as cuts, cracks or other fractures which appear in the outer surface of the cover of a golf ball after it is repeatedly struck with a club. Failures may appear anywhere in the cover and are either the result of a defect in the cover or occur towards the end of the useful life of the golf ball cover. Although the durability of ionomer resin golf ball covers varies depending upon the particular composition of the cover blend, conventional golf balls having ionomer resin covers (with a typical cover hardness of 65–70 Shore D) are generally expected to have a useful life of at least about 250 hits by a golf club before a single failure occurs and at least about 300 hits before 50% of the golf balls fail.

The present invention is directed to golf balls comprising at least a cover layer and a core layer, wherein at least one of the layers is formed from a composition comprising an ionomeric blend as well as a variety of standard golf ball additives; wherein the ionomeric blend comprises from about 97 wt. % to about 20 wt. % of at least one high acid ionomer, from about 3 wt. % to <15 wt. % of at least one very low modulus ionomer (VLMI) and from 0 wt. % to about 70 wt. % of at least one standard ionomer. Preferably, from about 3 wt. % to about 14 wt. % of at least one VLMI is present.

When the optional standard ionomer is present in the ionomeric blend, the blend preferably comprises from about 94 wt. % to about 15 wt. % of at least one high acid ionomer, from about 3 wt. % to <15 wt. % of at least one VLMI and from about 3 wt. % to about 70 wt. % of at least one standard ionomer resin, and, more preferably, from about 70 wt. % to about 17 wt. % of at least one high acid ionomer, from about 5 wt. % to about 14 wt. % of at least one VLMI and from about 25 wt. % to about 68 wt. % of at least one standard ionomer resin.

The present invention is directed to methods and compositions for use in the manufacture of golf balls, particularly, golf ball covers. However, the compositions may also be used to form cores and intermediate layers if desired. As used herein, an "intermediate layer" is an independent layer between a cover and a core. Such an intermediate layer may be distinguished from a cover or a core by some difference in the materials comprising the layers. An intermediate layer may, for example, have a distinct composition, a different proportion of components, a different molecular weight of a component, a different molecular weight distribution of a component, or a different degree of curing or crosslinking when compared to the corresponding attribute of the component comprising the adjacent cover or core layer. Optionally, an intermediate layer may be a wound layer, i.e., comprise the windings of a wound golf ball such as a liquid or solid center wrapped in elastomeric windings, as known to those skilled in the golf ball art. Moreover, a "cover" or a "core" as these terms are used herein may comprise a single layer or a plurality of layers. An intermediate layer may be used, if desired, with a dual or a multilayer cover or a dual or a multilayer core, or with both a multilayer cover and a multilayer core. Therefore, an intermediate layer is also sometimes referred to in the art as an inner cover layer, as an outer core layer or as a mantle layer.

Although the ionomeric blends of the present invention may be present in any layer, they are preferably present in at least one layer selected from a cover layer and an intermediate layer. More preferably, the ionomeric blends of the present invention are present in the cover layer.

The ionomers of the invention generally consist of a copolymer of a mono-olefin, e.g., an alkene, with at least one other type of comonomer selected from the group consisting of unsaturated mono- or di-carboxylic acids having 3 to 12 carbon atoms and esters thereof (the polymer contains from about 1% to about 50% by weight of the unsaturated mono- or di-carboxylic acid and/or ester thereof) with from about 10% to about 90% of the carboxylic acid groups neutralized by a cation.

As used herein, a "copolymer" is defined as a polymer comprising at least two different monomeric units. Thus, a polymeric chain made up of three different monomers (also known as a terpolymer) is included within the term "copolymer," as are polymer chains containing more than three different monomeric units. Copolymers may be formed in many ways known to those of ordinary skill in the art, for example, by polymerizing two or more different monomers, by graft copolymerization or block copolymerization, wherein an existing polymer chain is further reacted with a different monomer, and by a post-polymerization reaction, e.g., partial hydrolysis of the ester side-groups of a polymer.

The high acid copolymer ionomers of the present invention may be ethylenic, i.e., comprise E/X/Y copolymers where E is ethylene, X is a softening comonomer such as acrylate or methacrylate present from 0 wt. % to about 50 wt. % in the copolymer, and Y is acrylic or methacrylic acid present in from 16.5 wt. % to about 35 wt. % of the polymer, wherein the acid moiety is neutralized from about 1% to about 90% to form an ionomer by at least one cation.

Preferably, the acrylic or methacrylic acid (Y) comprises from 16.5 wt. % to about 30 wt. % of the high acid copolymer ionomer, more preferably from 16.5 wt. % to about 25 wt. %.

Preferably, the softening comonomer (X) comprises from 0 wt. % to about 25 wt. % of the high acid copolymer ionomer, more preferably from about 0 wt. % to about 20 wt. %.

Specific ethylenic high acid copolymers include but are not limited to ethylene/acrylic acid, ethylene/methacrylic acid, ethylene/acrylic acid/methyl acrylate, ethylene/methacrylic acid/methyl acrylate, ethylene/acrylic acid/ethyl acrylate, ethylene/methacrylic acid/ethyl acrylate, ethylene/acrylic acid/n-butyl acrylate, ethylene/methacrylic acid/n-butyl acrylate, ethylene/acrylic acid/iso-butyl acrylate, ethylene/methacrylic acid/iso-butyl acrylate, ethylene/acrylic acid/n-butyl methacrylate, ethylene/methacrylic acid/n-butyl methacrylate, ethylene/acrylic acid/methyl methacrylate, and ethylene/methacrylic acid/methyl methacrylate. Preferred ethylenic high acid copolymers are ethylene/acrylic acid, ethylene/methacrylic acid, ethylene/(meth) acrylic acid/n-butyl acrylate, ethylene/(meth)acrylic acid/ethyl acrylate, and ethylene/(meth)acrylic acid/methyl acrylate copolymers. More preferred ethylenic high acid copolymers are ethylene/acrylic acid and ethylene/methacrylic acid.

Preferably, the high acid ionomer is neutralized at least about 20%, more preferably, at least about 30%, by a metal cation to form an ionomer. Preferably, the cation is lithium, sodium, potassium, magnesium, calcium, barium, lead, tin, zinc or aluminum, or a combination of such cations.

More preferably, the cation is lithium, sodium, magnesium, zinc or a combination of such cations.

The VLMI copolymer ionomers of the present invention may be ethylenic, i.e., comprise E/X/Y copolymers where E is ethylene, X is a softening comonomer present up to about 50 wt. % in the copolymer, and Y is acrylic or methacrylic acid present in from about 5 wt. % to about 35 wt. % of the polymer, wherein the acid moiety is neutralized from about 1% to about 90% to form an ionomer by at least one cation.

Preferably, the acrylic or methacrylic acid (Y) comprises from about 7 wt. % to about 25 wt. % of the VLMI, more preferably from about 9 wt. % to about 15 wt. %.

Preferably, the softening comonomer (X) comprises from about 15 wt. % to about 35 wt. % of the VLMI, more preferably from about 18 wt. % to about 27 wt. %.

Typically, the softening comonomer is an alkyl(alkyl)acrylate, i.e., an alkyl alkylacrylate or an alkyl acrylate, wherein the alkyl aroups, independently, may be any linear or branched alkyl group of up to about 6 carbon atoms. As used herein, the phrase "linear or branched alkyl group of up to about 6 carbon atoms" means any substituted or unsubstituted acyclic carbon-containing compound, including alkanes, alkenes and alkynes. Examples of alkyl groups include but are not limited to methyl, ethyl, n-propyl, iso-propyl, n-butyl, iso-butyl, tert-butyl, pentyl and hexyl; alkylene, for example, ethylene, propylene, butylene, butadiene, pentene, hexene and the like; and alkynes. The ordinary skilled artisan is familiar with numerous such linear and branched alkyl groups, all of which are within the scope of the present invention.

Additionally, such alkyl groups may also contain various substituents in which one or more hydrogen atoms has been replaced by a functional group. Functional groups include but are not limited to hydroxyl, amino, epoxy, carboxyl, sulfonic amide, ester, ether, phosphates, thiol, nitro, silane and halogen (fluorine, chlorine, bromine and iodine), to mention but a few.

Preferably, the softening comonomer is an alkyl(meth)acrylate. Preferred softening comonomers include n-butyl (meth)acrylate, iso-butyl(meth)acrylate, ethyl(meth)acrylate, methyl(meth)acrylate and mixtures thereof.

Specific ethylenic VLMI copolymers include but are not limited to ethylene/acrylic acid/methyl acrylate, ethylene/methacrylic acid/methyl acrylate, ethylene/acrylic acid/ethyl acrylate, ethylene/methacrylic acid/ethyl acrylate, ethylene/acrylic acid/n-butyl acrylate, ethylene/methacrylic acid/n-butyl acrylate, ethylene/acrylic acid/iso-butyl acrylate, ethylene/methacrylic acid/iso-butyl acrylate, ethylene/acrylic acid/n-butyl methacrylate, ethylene/methacrylic acid/n-butyl methacrylate, ethylene/acrylic acid/methyl methacrylate, and ethylene/methacrylic acid/methyl methacrylate. Preferred ethylenic VLMI copolymers are ethylene/(meth)acrylic acid/n-butyl(meth)acrylate, ethylene/(meth)acrylic acid/iso-butyl(meth)acrylate, ethylene/(meth) acrylic acid/ethyl(meth)acrylate, and ethylene/(meth)acrylic acid/methyl(meth)acrylate copolymers.

Preferably, the VLMI is neutralized at least about 20%, more preferably, at least about 30%, by a metal cation to form an ionomer. Preferably, the cation is lithium, sodium, potassium, magnesium, calcium, barium, lead, tin, zinc or aluminum, or a combination of such cations. More preferably, the cation is lithium, sodium, magnesium, zinc or a combination of such cations.

The standard copolymer ionomers of the present invention may be ethylenic, i.e., comprise E/X/Y copolymers where E is ethylene, X is a softening comonomer present up to about 50 wt. % in the copolymer, and Y is acrylic or methacrylic acid present in from about 5 wt. % to <16.5 wt. % of the polymer, wherein the acid moiety is neutralized from about 1% to about 90% to form an ionomer by at least one cation.

Preferably, the acrylic or methacrylic acid (Y) comprises from about 7 wt. % to <16.5 wt. % of the standard copolymer ionomer, more preferably from about 9 wt. % to about 15 wt. %.

Preferably, the softening comonomer (X) comprises from 0 wt. % to about 25 wt. % of the standard copolymer ionomer, more preferably from 0 wt. % to about 20 wt. %.

Specific ethylenic standard copolymers include but are not limited to ethylene/acrylic acid, ethylene/methacrylic acid, ethylene/acrylic acid/methyl acrylate, ethylene/methacrylic acid/methyl acrylate, ethylene/acrylic acid/ethyl acrylate, ethylene/methacrylic acid/ethyl acrylate, ethylene/acrylic acid/n-butyl acrylate, ethylene/methacrylic acid/n-butyl acrylate, ethylene/acrylic acid/iso-butyl acrylate, ethylene/methacrylic acid/iso-butyl acrylate, ethylene/acrylic acid/n-butyl methacrylate, ethylene/methacrylic acid/n-butyl methacrylate, ethylene/acrylic acid/methyl methacrylate, and ethylene/methacrylic acid/methyl methacrylate. Preferred ethylenic standard copolymers are ethylene/acrylic acid, ethylene/methacrylic acid, ethylene/(meth) acrylic acid/n-butyl acrylate, ethylene/(meth)acrylic acid/ethyl acrylate, and ethylene/(meth)acrylic acid/methyl acrylate copolymers. More preferred ethylenic standard copolymers are ethylene/acrylic acid and ethylene/methacrylic acid. Preferably, the high acid ionomer is neutralized at least about 20%, more preferably, at least about 30%, by a metal cation to form an ionomer. Preferably, the cation is lithium, sodium, potassium, magnesium, calcium, barium, lead, tin, zinc or aluminum, or a combination of such cations.

More preferably, the cation is lithium, sodium, magnesium, zinc or a combination of such cations.

If desired, the ionomeric blend may comprise from about 97 wt. % to about 85 wt. % of at least one high acid ionomer 35 and from about 3 wt. % to <15 wt. % of at least one VLMI. Alternatively, the ionomeric blend may comprise from about 95 wt. % to about 87 wt. % of at least one high acid ionomer and from about 5 wt. % to about 13 wt. % of at least one VLMI.

Ionomers are generally colorless compounds. Therefore, it is sometimes desirable to add materials such as coloring agents (sometimes known as whitening agents) in order to impart a suitable color to a golf ball composition formed from an ionomer blend, e.g., when the blends are used in covers. Suitable coloring agents include pigments such as titanium dioxide ($TiO_2$), zinc oxide (ZnO), calcium oxide (CaO) and barium sulfate ($BaSO_4$), with $TiO_2$ generally being a preferred material.

In order to achieve uniform color, it is important that the coloring agent be thoroughly mixed and well dispersed throughout the composition. However, such dispersion is not easily achieved, as coloring agents, especially those having a relatively small particle size such as $TiO_2$, do not readily disperse throughout large batches of ionomers.

One conventional method of obtaining an acceptable dispersion of coloring agent throughout the composition is to form a color concentrate containing a coloring agent and admixing the color concentrate with the ionomeric blend. The color concentrate is formed by mixing the coloring agent with a carrier ionomer resin. The carrier ionomer resin may comprise a high acid ionomer, a standard ionomer, a VLMI, or any combination of these ionomer types. Preferably, the carrier resin comprises a high acid ionomer and/or a standard ionomer.

Any conventional mixing method may be employed to form the color concentrate. A preferred method is mixing the coloring agent and the carrier ionomer resin in a twin screw extruder and pelletizing the resulting extrudate, thereby forming pellets of the color concentrate composition.

The color concentrate comprises from about 20 wt. % to about 60 wt. % coloring agent and from about 80 wt. % to about 40 wt. % of at least one carrier ionomer resin; preferably from about 30 wt. % to about 50 wt. % coloring agent and from about 70 wt. % to about 50 wt. % of at least one carrier ionomer resin and more preferably from about 40 wt. % to about 45 wt. % coloring agent and from about 60 wt. % to about 55 wt. % of at least one carrier ionomer resin. Preferably, the coloring agent comprises $TiO_2$.

Typically, the color concentrate pellets are subsequently admixed with pellets of the ionomer resins comprising the ionomeric blend to form a composition for forming a golf ball layer. When a concentrate is present, the composition comprises from about 99 wt. % to about 90 wt. % of the ionomeric blend and from about 1 wt. % to about 10 wt. % color concentrate, preferably from about 98 wt. % to about 93 wt. % of the ionomeric blend and from about 2 wt. % to about 7 wt. % color concentrate, and most preferably from about 96 wt. % to about 94 wt. % of the ionomeric blend and from about 4 wt. % to about 6 wt. % color concentrate. Unless otherwise noted, "wt. %" as used herein refers to the percentage by total weight of the composition.

Additional materials conventionally included in golf ball compositions may be added to the compositions of the invention to enhance the formation of golf ball layers, including covers. These additional materials include, but are not limited to, ultraviolet light stabilizers and/or absorbers, dyes, pigments, fluorescent pigments, optical brighteners, processing aids, metal particles, such as metal flakes, metal powders and mixtures thereof, and other conventional additives. Antioxidants, stabilizers, softening agents, plasticizers, including internal and external plasticizers, impact modifiers, toughening agents, foaming agents, fillers, reinforcing materials and compatibilizers can also be added to any composition of the invention. All of these materials, which are well known in the art, are added for their usual purpose in typical amounts. The total amount of such additional components is typically from about 1 wt. % to about 10 wt. % and, preferably, from about 2 wt. % to about 8 wt. %.

The blended ionomer compositions of the invention can be reinforced by blending with a wide range of fillers, e.g., glass fibers, inorganic particles and metal particles, as is known to those with skill in the art.

Preferably, the cover stock used to make a golf ball cover in accordance with the present invention is a blend of the ionomer resins in the amounts specified hereinabove.

Blending of the ionomer resins is accomplished by combining the polymer components by methods familiar to those in the polymer blending art, for example, with a two roll mill, a Banbury mixer or a single or twin-screw extruder. The single screw extruder may optionally have a grooved barrel wall, comprise a barrier screw or be of a shortened screw design.

The twin screw extruder may be of the counter-rotating non-intermeshing, co-rotating non-intermeshing, counter-rotating fully intermeshing or co-rotating fully intermeshing type.

Conventional equipment used in the production of golf balls may be used to form the golf balls of the invention in a manner well known to those skilled in the art. Good results for producing golf ball covers comprising the compositions of the invention have been obtained by mixing the ionomer resins in a solid, pelletized form and then placing the mix into a hopper which is used to feed the heated barrel of an injection molding machine. Further mixing is accomplished by a screw within the heated injection molder barrel. The injection molding machine is used either to make preformed half-shells, subsequently compression molded over a core, e.g., in a ball mold, or to directly mold the cover about the core, e.g., in a retractable-pin mold. Such molds and machines are conventional.

After molding, golf balls comprising the golf ball compositions of the invention can be finished by buffing, painting and stamping.

The properties such as hardness, modulus, core diameter, intermediate layer thickness and cover layer thickness of the golf balls of the present invention have been found to effect play characteristics such as durability, spin, initial velocity and feel of the present golf balls.

In particular, the diameter of the core of the present invention is from about 1.000 inches to about 1.630 inches. Preferably the diameter of the core is from about 1.300 inches to about 1.600 inches. More preferably, the diameter of the core is from about 1.390 inches to about 1.580 inches. The thickness of an intermediate layer of the invention, when present, is from about 0.020 inches to about 0.100 inches. Preferably, the thickness of the intermediate layer is from about 0.020 inches to about 0.090 inches. More preferably, the thickness of the intermediate layer is from about 0.030 inches to about 0.090 inches. Most preferably, the thickness of the intermediate layer is from about 0.030 inches to about 0.080 inches. Furthermore, the thickness of the cover layer of the present invention is from about 0.030 inches to about 0.120 inches. Preferably, the thickness of the cover layer is from about 0.040 inches to about 0.100 inches. Most preferably, the thickness of the cover layer is from about 0.050 inches to about 0.090 inches. Preferably, the overall diameter of the core and all intermediate layers is from about 80% to about 98% of the overall diameter of the finished ball, and is preferably from about 1.680 inches to about 1.780 inches.

The present golf ball comprising a cover formed from the ionomer blend of the present invention can have an overall diameter of any size. Although the United States Golf Association (hereafter "USGA") Rules of Golf limit the minimum size of a competition golf ball to 1.680 inches in diameter, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is from about 1.680 inches to about 1.740 inches.

Several physical properties such as hardness and modulus of the various layers of the golf balls of the present invention are believed to impact the playing characteristics of such golf balls. For example, the flexural and/or tensile modulus of the intermediate layer are believed to have an effect on the "feel" of the golf balls of the present invention. Accordingly, when the golf balls of the present invention have an intermediate layer, it is preferable that the flexural modulus of this layer is from about 500 psi to about 500,000 psi. More preferably, the flexural modulus of the intermediate layer is from about 1,000 psi to about 250,000 psi. Most preferably, the flexural modulus of the intermediate layer is from about 2,000 psi to about 200,000 psi.

Similarly, it is preferable that the golf balls of the present invention have a cover layer with a flexural modulus from about 10,000 psi to about 150,000 psi. More preferably, the flexural modulus of the cover layer is from about 15,000 psi to about 120,000 psi. Most preferably, the flexural modulus of the cover layer is from about 18,000 psi to about 110,000 psi.

The golf ball compositions of the present invention have a core hardness from about 50 Shore A to about 90 Shore D. Preferably, the core has a Shore D hardness from about 30 to about 65. More preferably, the core has a Shore D hardness from about 35 to about 60. Any intermediate layer present in the golf balls of the present invention preferably has a hardness of from about 60 Shore A to about 85 Shore D. More preferably, the hardness of an intermediate layer is from about 65 Shore A to about 80 Shore D. The cover layer of the golf balls of the present invention preferably has a Shore D hardness from about 40 to about 90. More preferably, the Shore D hardness of the cover layer is from about 45 to about 85. Most preferably, the cover layer has a Shore D hardness from about 50 to about 80.

Forming an ionomeric blend from a high acid ionomer and a VLMI and, optionally, a standard ionomer, dramatically improves the ability to control the mechanical properties of the blend, including tensile and flexural modulus and Shore hardness.

The compositions of the invention provide golf balls having the distance and resilience of ionomer covered two piece balls and the feel, click and control of balata covered three-piece balls with good durability.

The following examples of golf balls having cover layers formed in accordance with the present invention are given to illustrate the present invention. However, it is to be understood that the examples are for illustrative purposes only and in no manner is the present invention limited to the specific disclosures therein.

EXAMPLES

Four one-dozen batches of three-piece golf balls were made using conventional manufacturing methods. These golf balls were formed from a 1.390 inch diameter cross-linked polybutadiene core filled with CaO, a cover 0.085 inches thick made from the cover blends formulated as described below, and an intermediate layer 0.060 inches thick interposed between the cover and the core. The intermediate layer was formed from HYTREL® 3078 filled with 20 wt. % ZnO.

The following ionomers were used in the covers:

SURLYN® 8140: a high acid copolymer believed to consist of ethylene and from 17 to about 22 percent methacrylic acid, having from about 30 to about 60 percent of the acid groups neutralized with sodium and a Shore D hardness of about 70;

SURLYN® 8320: a VLMI believed to consist of a terpolymer of ethylene, from about 8 to about 11 percent methacrylic acid, and n-butyl acrylate, having from about 40 to about 60 percent of the acid groups neutralized with sodium and a Shore D hardness of about 35;

SURLYN® 7940: a standard copolymer believed to consist of ethylene and from about 13 to 15.5 percent methacrylic acid, having from about 30 to about 60 percent of the acid groups neutralized with lithium and a Shore D hardness of about 68; and SURLYN® 8528: a standard copolymer believed to consist of ethylene and from about 8 to about 11 percent methacrylic acid, having from about 40 to about 60 percent of the acid groups neutralized with sodium and a Shore D hardness of about 60.

The ionomer cover blends of the invention (Example Nos. 1 and 2) comprised 10 wt. % of SURLYN® 8320 (the VLMI) and 85 wt. % of a base ionomer resin consisting of a 50/50 blend by weight of SURLYN® 8140 (a high acid ionomer) and SURLYN® 7940 (the standard ionomer component). Additionally, 5 wt. % of a color concentrate comprising about 40 wt. % $TiO_2$ and about 60 wt. % of one of the carrier ionomer resins described below was used.

The control ionomer cover blends (Nos. 1C and 2C) were formed without the VLMI and comprised 95 wt. % of the 50/50 blend by weight of SURLYN® 8140/SURLYN® 7940 and 5 wt. % of the color concentrate.

Two batches of golf balls, one with VLMI (No. 1) and one without (No. 1C), were formed using SURLYN® 8140 (high acid ionomer) as the carrier ionomer resin for color concentrate A. The other two batches, one with VLMI (No. 2) and one without (No. 2C), were formed using SURLYN® 8528 (a standard ionomer) as the carrier ionomer resin for color concentrate B.

The pelletized base ionomers and color concentrate pellets were blended in a blending tote. The pellet blend was then placed into a hopper which was used to feed the heated barrel of an injection molding machine. Further mixing was accomplished by a screw within the heated injection molder barrel. The injection molding machine was used to make preformed half-shells, two of which were subsequently compression molded over an (intermediate layer+core) assembly in a ball mold to form each golf ball.

Each dozen golf ball batch was tested for durability using a Titleist-made Rotating Pendulum Testing Machine. The machine, rotating at 1100 rpm, was configured to repeatedly strike the golf balls with a grooved metal face-plate placed 13.5 inches from the drive motor and angled at approximately 13°. The balls were evaluated after every 50 hits to determine if any of the balls exhibited a failure. The testing cycle continued until at least 50% of the balls failed. None of the balls failed before 200 hits. The results of the durability tests are reported in Table I.

TABLE I

| | Composition, wt. % | | | | | Golf Ball Properties | | | | |
| | | | | | | Durability[b], at Number of Hits | | | | % |
| Example Number | SURLYN® 8140[d] | SURLYN® 7940[e] | SURLYN® 8320[f] | Concentrate[a] A[g] | B[h] | 200 | 250 | 300 | 350 | Failed[c] |
|---|---|---|---|---|---|---|---|---|---|---|
| 1 | 42.5 | 42.5 | 10.0 | 5.0 | 0 | 0 | 2 | 4 | — | 50 |
| 1C | 47.5 | 47.5 | 0 | 5.0 | 0 | 1 | 3 | 2 | — | 50 |
| 2 | 42.5 | 42.5 | 10.0 | 0 | 5.0 | 0 | 0 | 1 | 5 | 50 |
| 2C | 47.5 | 47.5 | 0 | 0 | 5.0 | 1 | 0 | 1 | 7 | 75 |

[a]40 wt. % TiO$_2$/60 wt. % ionomer
[b]Number of failures (No failure for all Examples below 200 hits)
[c]At highest number of hits
[d]High acid ionomer partially neutralized with sodium
[e]Standard ionomer partially neutralized with lithium
[f]VLMI partially neutralized with sodium
[g]Ionomer = SURLYN® 8140
[h]Ionomer = SURLYN® 8528 (standard partially neutralized with sodium)

As illustrated in Table I, the Example No. 1C golf balls, made with a cover blend formed without any VLMI, i.e., from the high acid ionomer/standard ionomer blend and a high acid ionomer carrier resin color concentrate A, exhibited a failure as early as 200 hits. Example No. 1C, without any VLMI, also produced a total of 4 failures after only 250 hits. In comparison, the Example No. 1 golf balls, having a cover formed from the VLMI/high acid ionomer/standard ionomer blend with the same color concentrate, did not exhibit any failures at all until 250 hits. Example No. 1, with VLMI, also exhibited only 2 total failures at 250 hits, half the number of failures of Example 1C at the same number of hits.

Moreover, Example No. 2 golf balls, made with a cover blend formed with VLMI, i.e., from the VLMI/high acid ionomer/standard ionomer blend and a standard ionomer carrier resin for color concentrate B, did not exhibit any failure at all until 300 hits. In contrast, Example No. 2C, without any VLMI, had one failure as soon as 200 hits and, by 300 hits, exhibited 2 total failures.

Furthermore, at 350 hits, Example No. 2C, without any VLMI, produced a total of 9 failures, i.e., 75% of the golf balls tested had failed. However, for Example No. 2, with VLMI in the cover blend, only 6 balls (50%) failed after 350 hits.

While it is apparent that the illustrative embodiments of the invention herein disclosed fulfills the objective stated above, it will be appreciated that numerous modifications and other embodiments may be devised by those skilled in the art. Therefore, it will be understood that the appended claims are intended to cover all such modifications and embodiments which come within the spirit and scope of the present invention.

The contents of all patents cited herein are incorporated by reference in their entirety.

What is claimed is:

1. A golf ball comprising a core layer, at least one intermediate layer, and a cover layer, wherein at least one of the core or intermediate layers is formed of a composition comprising a blend of ionomeric components that comprises;
   about 20 to about 97 weight percent of at least one high acid ionomer resin having an acid monomer content from 16.5 to about 35 weight percent of the high acid ionomer resin; and
   about 3 to less than 15 weight percent of at lease one very low modulus ionomer resin having a softening comonomer, wherein the amount of the softening comonomer is present in an amount up to about 50 weight percent of the very low modulus ionomer resin.

2. The golf ball of claim 1, wherein the at least one high acid ionomer resin is a copolymer of ethylene and from about 16.5 to about 25 weight percent of at least one comonomer comprising acrylic acid, methacrylic acid, or a combination thereof and wherein the acid moiety is neutralized from about 1 to about 90 percent by at least one cation selected from the group consisting of lithium, sodium, potassium, magnesium, calcium, barium, lead, tin, zinc, aluminum, and mixtures thereof.

3. The golf ball of claim 2, wherein the acid moiety is neutralized from at least about 30 percent.

4. The golf ball of claim 2, wherein the at least one cation is selected from the group consisting of lithium, sodium, magnesium, zinc, and mixtures thereof.

5. The golf ball of claim 1, wherein the very low modulus ionomer is present in an amount from about 3 to about 13 weight percent of the total polymer.

6. The golf ball of claim 5, wherein the very low modulus ionomer is present in an amount from about 5 to about 13 weight percent of the total polymer.

7. The golf ball of claim 1, wherein the softening comonomer comprises an alkyl acrylate or an alkyl(alkyl)acrylate.

8. The golf ball of claim 7, wherein the softening comonomer comprises methyl acrylate, ethyl acrylate, n-propyl acrylate, iso-propyl acrylate, n-butyl acrylate, iso-butyl acrylate, tert-butyl acrylate, pentyl acrylate, hexyl acrylate, and mixtures thereof.

9. The golf ball of claim 8, wherein the softening comonomer comprises n-butyl acrylate or iso-butyl acrylate.

10. The golf ball of claim 7, wherein the softening comonomer comprises methyl(alkyl)acrylate, ethyl(alkyl)acrylate, n-propyl(alkyl)acrylate, iso-propyl(alkyl)acrylate, n-butyl(alkyl)acrylate, iso-butyl(alkyl)acrylate, tert-butyl(alkyl)acrylate, pentyl(alkyl)acrylate, hexyl(alkyl)acrylate, and mixtures thereof.

11. The golf ball of claim 1, wherein the softening comonomer is present in an amount from about 15 to about 35 weight percent of the at least one very low modulus ionomer.

12. The golf ball of claim 11, wherein the softening comonomer is present in an amount from about 15 to about 27 weight percent of the at least one very low modulus ionomer.

13. The golf ball of claim 1, wherein the very low modulus ionomer further comprises a copolymer of acrylic or methacrylic acid present in an amount from about 5 to about 35 weight percent of the very low modulus ionomer.

14. The golf ball of claim 1, wherein the composition comprises an ionomeric blend of the at least one high acid ionomer in an amount from about 85 to about 97 weight percent of the total polymer with the very low modulus ionomer.

15. The golf ball of claim 1, wherein the composition further comprises a standard ionomer being present with the at least one high acid ionomer in a combined amount from about 85 to about 97 weight percent of the total polymer, wherein the standard ionomer comprises an E/X/Y copolmer where E comprises ethylene, X comprises a softening comonomer present in an amount less than about 50 percent by weight of the copolymer, and Y comprises acrylic acid, methacrylic acid, or a mixture thereof present in an amount from about 5 weight percent to less than about 16.5 weight percent.

16. The golf ball of claim 1, the at least one intermediate layer comprises the composition.

17. The golf ball of claim 16, wherein the at least one intermediate layer is an inner cover layer and comprises the composition.

18. The golf ball of claim 16, wherein the at least one intermediate layer has a thickness of about 0.02 inches to about 0.1 inches.

19. The golf ball of claim 16, wherein the at least one intermediate layer has a thickness of about 0.03 inches to about 0.08 inches.

20. The golf ball of claim 1, wherein the cover layer is formed of a blend of at least one high acid ionomer resin having an acid monomer content from 16.5 to about 35 weight percent of the high acid ionomer resin and at least one very low modulus ionomer resin having a softening comonomer.

21. The golf ball of claim 1, wherein the cover layer comprises a plurality of cover layers.

22. The golf ball of claim 21, wherein one of the plurality of cover layers comprises a blend of at least one high acid ionomer resin having an acid monomer content from 16.5 to about 35 weight percent of the high acid ionomer resin and at least one very low modulus ionomer resin having a softening comonomer.

23. A golf ball comprising a core layer, intermediate layer, and a cover layer, wherein at least one of the core and intermediate layers is formed of a composition comprising a blend of ionomeric components that comprises:
   about 85 to about 97 weight percent of at least one high acid ionomer resin having an acid monomer content from 16.5 to about 35 weight percent of the high acid ionomer resin; and
   at least one very low modulus ionomer resin present in an amount of about 3 to about 13 weight percent based on the total polymer and including a softening comonomer comprising n-butyl acrylate present in an amount up to about 50 weight percent of the very low modulus ionomer resin.

24. A golf ball comprising a core layer, at least one intermediate layer disposed over the core layer, and a cover layer disposed thereabout, wherein the at least one intermediate layer is formed of a composition comprising:
   about 20 to about 97 weight percent of at least one high acid ionomer resin having an acid monomer content from 16.5 to about 35 weight percent of the high acid ionomer resin; and
   about 3 to less than 15 weight percent of at least one very low modulus ionomer resin having a softening comonomer, wherein the amount of the softening co-monomer is present in an amount up to about 50 weight percent of the very low modulus ionomer resin.

25. A golf ball comprising a core layer, at least one intermediate layer disposed over the core layer, and a cover layer disposed thereabout, wherein the at least one intermediate layer is formed of a composition consisting essentially of:
   4about 20 to about 97 weight percent of at least one high acid ionomer resin having an acid monomer content from 16.5 to about 35 weight percent of the high acid ionomer resin; and
   about 3 to less than 15 weight percent of at least one very low modulus ionomer resin having a softening comonomer, wherein the amount of the softening co-monomer is present in an amount up to about 50 weight percent of the very low modulus ionomer resin.

* * * * *